(12) United States Patent
Hoshi et al.

(10) Patent No.: US 12,460,562 B2
(45) Date of Patent: Nov. 4, 2025

(54) MIXED FLOW TURBINE AND TURBOCHARGER

(71) Applicant: MITSUBISHI HEAVY INDUSTRIES ENGINE & TURBOCHARGER, LTD., Sagamihara (JP)

(72) Inventors: Toru Hoshi, Tokyo (JP); Takao Yokoyama, Tokyo (JP); Toyotaka Yoshida, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 18/849,720

(22) PCT Filed: Mar. 28, 2022

(86) PCT No.: PCT/JP2022/015052
§ 371 (c)(1),
(2) Date: Sep. 23, 2024

(87) PCT Pub. No.: WO2023/187913
PCT Pub. Date: Oct. 5, 2023

(65) Prior Publication Data
US 2025/0207513 A1    Jun. 26, 2025

(51) Int. Cl.
*F01D 25/24*    (2006.01)
*F01D 5/14*    (2006.01)
*F02B 37/00*    (2006.01)

(52) U.S. Cl.
CPC .............. *F01D 25/24* (2013.01); *F01D 5/14* (2013.01); *F02B 37/00* (2013.01);
(Continued)

(58) Field of Classification Search
CPC . F01D 5/14; F01D 5/141; F01D 5/143; F01D 5/145; F02B 37/00; F05D 2220/40;
(Continued)

(56) References Cited

U.S. PATENT DOCUMENTS

| | | | |
|---|---|---|---|
| 9,708,913 B2 * | 7/2017 | Martinez-Botas Mateo | ................ F01D 5/143 |
| 10,378,369 B2 * | 8/2019 | Yokoyama | .............. F01D 9/026 |

(Continued)

FOREIGN PATENT DOCUMENTS

| | | | |
|---|---|---|---|
| JP | 52-16406 U | | 2/1977 |
| JP | S 5216406 U | * | 2/1977 |

(Continued)

OTHER PUBLICATIONS

International Preliminary Report on Patentability and Witten Opinion of the International Searching Authority for International Application No. PCT/JP2022/015052, dated Oct. 10, 2024, with an English translation.

(Continued)

*Primary Examiner* — Brian P Wolcott
(74) *Attorney, Agent, or Firm* — Birch, Stewart, Kolasch & Birch, LLP

(57) ABSTRACT

This mixed flow turbine is provided with a turbine wheel comprising a hub and blades provided at intervals in a circumferential direction of the hub on an outer peripheral surface of the hub. The tip ends of the leading edges of the blades are positioned on an outer side in the radial direction of the turbine wheel than the hub ends of the leading edges. When a distance between the downstream end of the outer peripheral surface of the hub and a rotational axis line of the turbine wheel is Dh and the average of distances between (Continued)

respective positions from the hub ends to the tip ends at the leading edges and the rotational axis line is Eave, Dh/Eave>0.4 is satisfied.

9 Claims, 9 Drawing Sheets

(52) U.S. Cl.
CPC ...... *F05D 2220/40* (2013.01); *F05D 2240/14* (2013.01); *F05D 2240/24* (2013.01); *F05D 2240/30* (2013.01)

(58) Field of Classification Search
CPC ........... F05D 2240/24; F05D 2240/303; F05D 2270/17
See application file for complete search history.

(56) References Cited

U.S. PATENT DOCUMENTS

| | | | | |
|---|---|---|---|---|
| 10,443,414 | B2* | 10/2019 | Yokoyama | F01D 25/24 |
| 10,731,467 | B2* | 8/2020 | Yoshida | F01D 11/08 |
| 10,781,704 | B2* | 9/2020 | Yoshida | F02C 6/12 |
| 10,941,662 | B2* | 3/2021 | Keating | F01D 5/048 |
| 11,215,057 | B2* | 1/2022 | Yoshida | F01D 5/141 |
| 11,885,238 | B2* | 1/2024 | Mohamed | F01D 5/225 |
| 2014/0154069 | A1 | 6/2014 | Martinez-Botas Mateo et al. | |
| 2015/0086396 | A1* | 3/2015 | Nasir | F01D 5/141 417/407 |
| 2015/0315961 | A1 | 11/2015 | Uhlenhake | |
| 2018/0223679 | A1 | 8/2018 | Yokoyama et al. | |
| 2019/0323368 | A1 | 10/2019 | Yoshida et al. | |

FOREIGN PATENT DOCUMENTS

| | | |
|---|---|---|
| JP | 52-169607 U | 12/1977 |
| JP | 62-228627 A | 10/1987 |
| JP | 8-109801 A | 4/1996 |
| JP | 8-303201 A | 11/1996 |
| JP | 2010-1874 A | 1/2010 |
| JP | 2014-35693 A | 2/2014 |
| JP | 2014-506974 A | 3/2014 |
| JP | 5870083 B2 | 2/2016 |
| JP | 6259520 B2 | 1/2018 |
| WO | WO 2016/002039 A1 | 1/2016 |
| WO | WO 2018/123045 A1 | 7/2018 |

OTHER PUBLICATIONS

International Search Report and Written Opinion of the International Searching Authority for International Application No. PCT/JP2022/015052, dated Jun. 14, 2022.
Japanese Office Action for Japanese Application No. 2024-510602, dated Aug. 12, 2025, with English translation.

* cited by examiner

TORNADO-LIKE SEPARATION

SUPPRESSION OF TORNADO-LIKE SEPARATION

MIXED FLOW TURBINE AND TURBOCHARGER

TECHNICAL FIELD

The present disclosure relates to a mixed flow turbine and a turbocharger.

BACKGROUND ART

PTL 1 discloses a turbine for suppressing a decrease in performance due to exhaust pulsation of an engine. The turbine has a turbine wheel and a turbine housing having a scroll portion extending along a circumferential direction of the turbine wheel. In a graph in which a flow path area of the scroll portion is A, a distance from a flow path center of the scroll portion to an axis of the turbine wheel is R, a circumferential position around the axis of the turbine wheel is represented on a horizontal axis, and A/R, which is a ratio of the flow path area A with respect to the distance R, is represented on a vertical axis, the scroll portion is configured such that the A/R has a distribution of a concave shape in at least a part.

CITATION LIST

Patent Literature

[PTL 1] Japanese Patent No. 5870083

SUMMARY OF INVENTION

Technical Problem

Since a separation of a flow on a surface of the turbine wheel is a factor that reduces turbine efficiency, it is important to suppress the separation on the surface of the turbine wheel in order to improve the turbine efficiency. In this regard, PTL 1 does not disclose any knowledge for suppressing the separation of the flow on the surface of the turbine wheel.

In view of the above circumstances, at least one embodiment of the present disclosure has an object to provide a mixed flow turbine and a turbocharger capable of suppressing separation of a flow on a surface of a turbine wheel and realizing high turbine efficiency.

Solution to Problem

In order to achieve the above object, a mixed flow turbine according to at least one embodiment of the present disclosure includes
    a turbine wheel including
        a hub, and
        blades provided on an outer peripheral surface of the hub at intervals in a circumferential direction of the hub,
    in which tip ends of leading edges of the blades are positioned on an outer side in a radial direction of the turbine wheel with respect to hub ends of the leading edges, and
    when a distance between a downstream end of the outer peripheral surface of the hub and a rotational axis of the turbine wheel is defined as Dh and an average value of distances between each position from the hub ends to the tip ends at the leading edges and the rotational axis is defined as Eave, a relationship Dh/Eave>0.4 is satisfied.

In order to achieve the above object, a turbocharger according to at least one embodiment of the present disclosure includes
    the above-described mixed flow turbine.

Advantageous Effects of Invention

According to at least one embodiment of the present disclosure, there are provided a mixed flow turbine and a turbocharger capable of suppressing separation of a flow on a surface of a turbine wheel and realizing high turbine efficiency.

DESCRIPTION OF EMBODIMENTS

Figure 1:
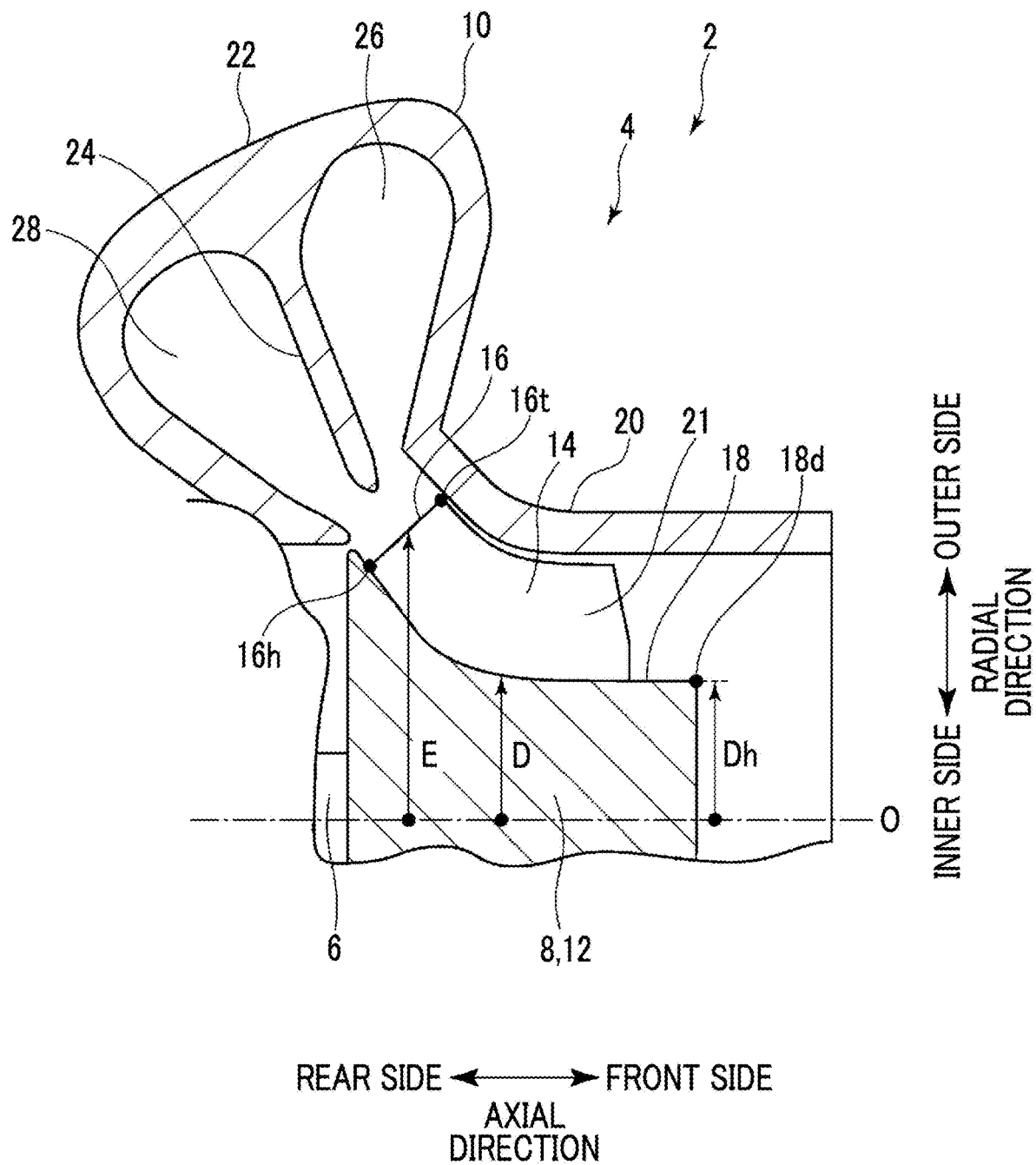
FIG. 1 is a schematic sectional view including a rotational axis of a turbine wheel in a mixed flow turbine according to an embodiment.

Hereinafter, some embodiments of the present disclosure will be described with reference to the accompanying drawings. Dimensions, materials, shapes, relative arrangements, and the like of components described as embodiments or illustrated in the drawings are not intended to limit the scope of the invention, but are merely explanatory examples.

For example, an expression representing a relative or absolute arrangement such as "in a certain direction", "along a certain direction", "parallel", "orthogonal", "center", "concentric", or "coaxial" does not strictly represent only such an arrangement, but also a tolerance or a state of being relatively displaced with an angle or a distance to the extent that the same function can be obtained.

For example, expressions such as "identical", "equal", and "homogeneous", which indicate that things are in the same state, not only represent a state of being strictly equal, but also represent a state in which there is a tolerance, or a difference to the extent that the same function can be obtained.

For example, an expression indicating a shape such as a square shape or a cylindrical shape not only represents a shape such as a square shape or a cylindrical shape in a geometrically strict sense, but also represents a shape that includes concave and convex portions, chamfered portions, or the like to the extent that the same effects can be obtained.

Meanwhile, an expression such as "comprising", "possessing", "provided with", "including", or "having" one component is not an exclusive expression excluding the presence of other components.

FIG. 1 is a schematic sectional view including a rotational axis O of a turbine wheel 8 in a mixed flow turbine 4 according to an embodiment. Hereinafter, a case where the mixed flow turbine 4 is a turbine of a turbocharger 2 will be described as an example. The mixed flow turbine 4 is connected to a compressor (not shown) via a rotating shaft 6 and is driven by an exhaust gas of an engine (not shown).

As shown in FIG. 1, the mixed flow turbine 4 includes the turbine wheel 8 and a casing 10 that accommodates the turbine wheel 8. The turbine wheel 8 includes a hub 12 and a plurality of blades 14 provided on an outer peripheral surface 18 of the hub 12 at intervals in a circumferential direction of the hub 12. A distance D between the outer peripheral surface 18 of the hub 12 and the rotational axis O of the turbine wheel 8 decreases toward a downstream side of a flow of a fluid along an axial direction of the turbine wheel 8.

Hereinafter, the "circumferential direction" means a circumferential direction of the turbine wheel 8, that is, the circumferential direction of the hub 12, unless otherwise specified, a "radial direction" means a radial direction of a turbine wheel 8, that is, a radial direction of the hub 12, unless otherwise specified, and the "axial direction" means the axial direction of the turbine wheel 8, that is, an axial direction of the hub 12, unless otherwise specified. In addition, a "front side" means the downstream side of the flow of the fluid along the turbine wheel 8 in the axial direction, and a "rear side" means an upstream side of the flow of the fluid along the turbine wheel 8 in the axial direction.

In the mixed flow turbine 4, tip ends 16t of leading edges 16 of the blades 14 are positioned on an outer side in the radial direction with respect to hub ends 16h of the leading edges 16. In addition, when a distance between a downstream end 18d of the outer peripheral surface 18 of the hub 12 and the rotational axis O of the turbine wheel 8 is defined as Dh and an average value of distances E between each position from the hub ends 16h to the tip ends 16t at the leading edges 16 and the rotational axis O of the turbine wheel 8 is defined as Eave, the turbine wheel 8 is configured to satisfy a relationship Dh/Eave>0.4. The average value Eave may be, in a simple manner, a value obtained by dividing a sum of distances between the hub ends 16h of the leading edges 16 and the rotational axis O and distances between the tip ends 16t of the leading edges 16 and the rotational axis O by 2.

In some embodiments, as shown in FIG. 1, the casing 10 includes a shroud wall 20, a scroll outer peripheral wall 22, and a dividing wall 24 (partition plate).

The shroud wall 20 is configured in a tubular shape to accommodate the turbine wheel 8. A central axis of the shroud wall 20 coincides with the rotational axis O (rotational axis of the hub 12) of the turbine wheel 8, and the above-described circumferential direction, radial direction, and axial direction coincide with a circumferential direction, a radial direction, and an axial direction of the shroud wall 20, respectively. A flow path 21 through which the exhaust gas of the engine flows is formed between the shroud wall 20 and the hub 12 of the turbine wheel 8.

The scroll outer peripheral wall 22 is connected to one end side (upstream side in a flow direction of a fluid in the flow path 21) of the shroud wall 20 and extends along the circumferential direction.

The dividing wall 24 is provided on an inner side of the scroll outer peripheral wall 22 and extends along the circumferential direction to partition an inside of the scroll outer peripheral wall 22 into a front side scroll flow path 26 and a rear side scroll flow path 28. The front side scroll flow path 26 and the rear side scroll flow path 28 are arranged in the axial direction, and the front side scroll flow path 26 is positioned on a front side of the rear side scroll flow path 28. As described above, the mixed flow turbine 4 shown in FIG. 1 is a so-called twin scroll type turbine. The exhaust gas is supplied from the engine (not shown) to each of the front side scroll flow path 26 and the rear side scroll flow path 28.

Figure 2:
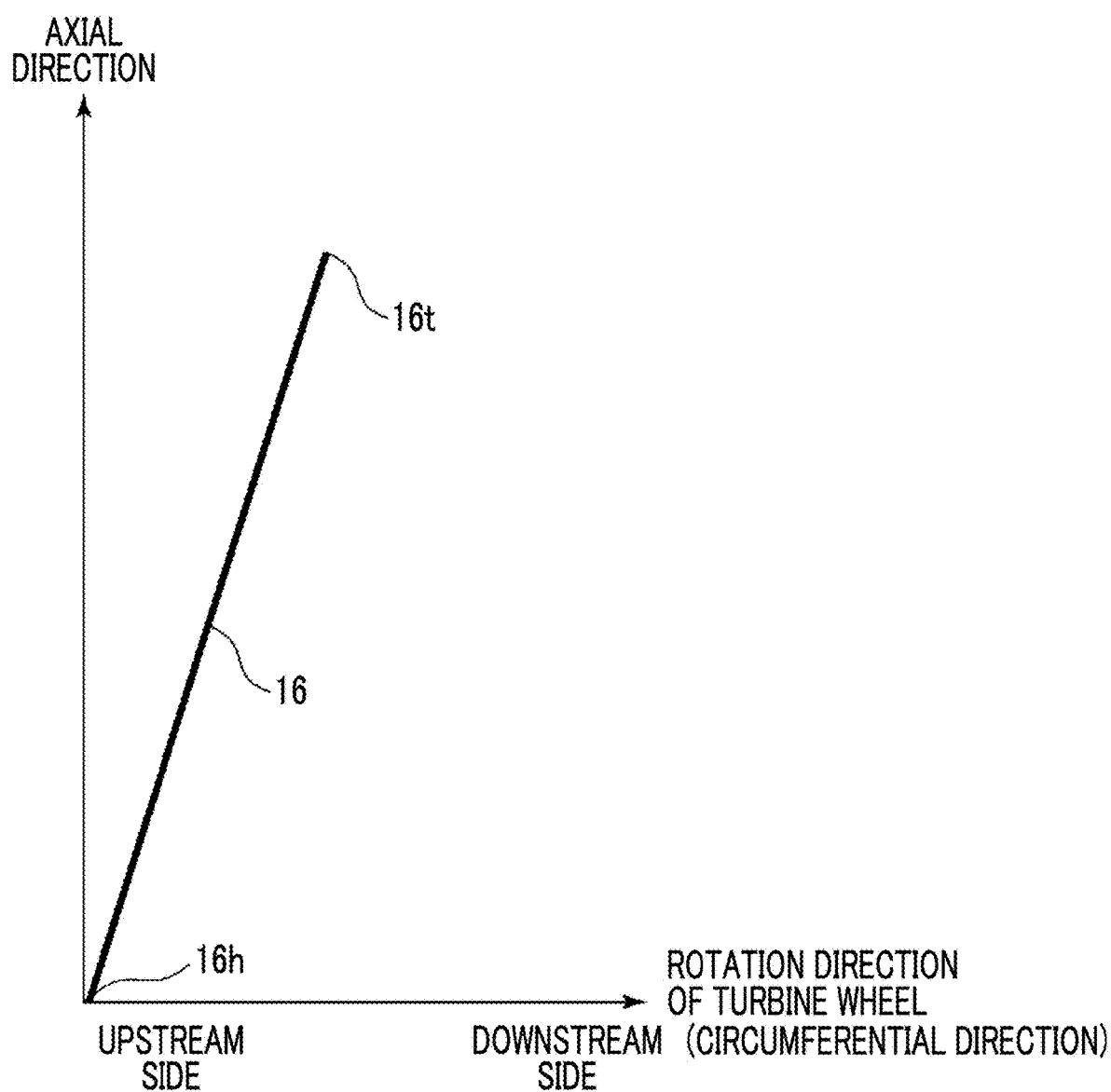
FIG. 2 is a schematic diagram showing an arrangement of a leading edge of a blade shown in FIG. 1 when a circumferential direction is represented on a horizontal axis and an axial direction is represented on a vertical axis with respect to the leading edge.

FIG. 2 is a schematic diagram showing positions of the leading edges 16 of the blades 14 shown in FIG. 1 expanded in the circumferential direction.

In some embodiments, for example, as shown in FIG. 2, the tip ends 16t of the leading edges 16 of the blades 14 are positioned on a downstream side in a rotation direction of the turbine wheel 8 with respect to the hub ends 16h of the leading edges 16.

Figure 3:
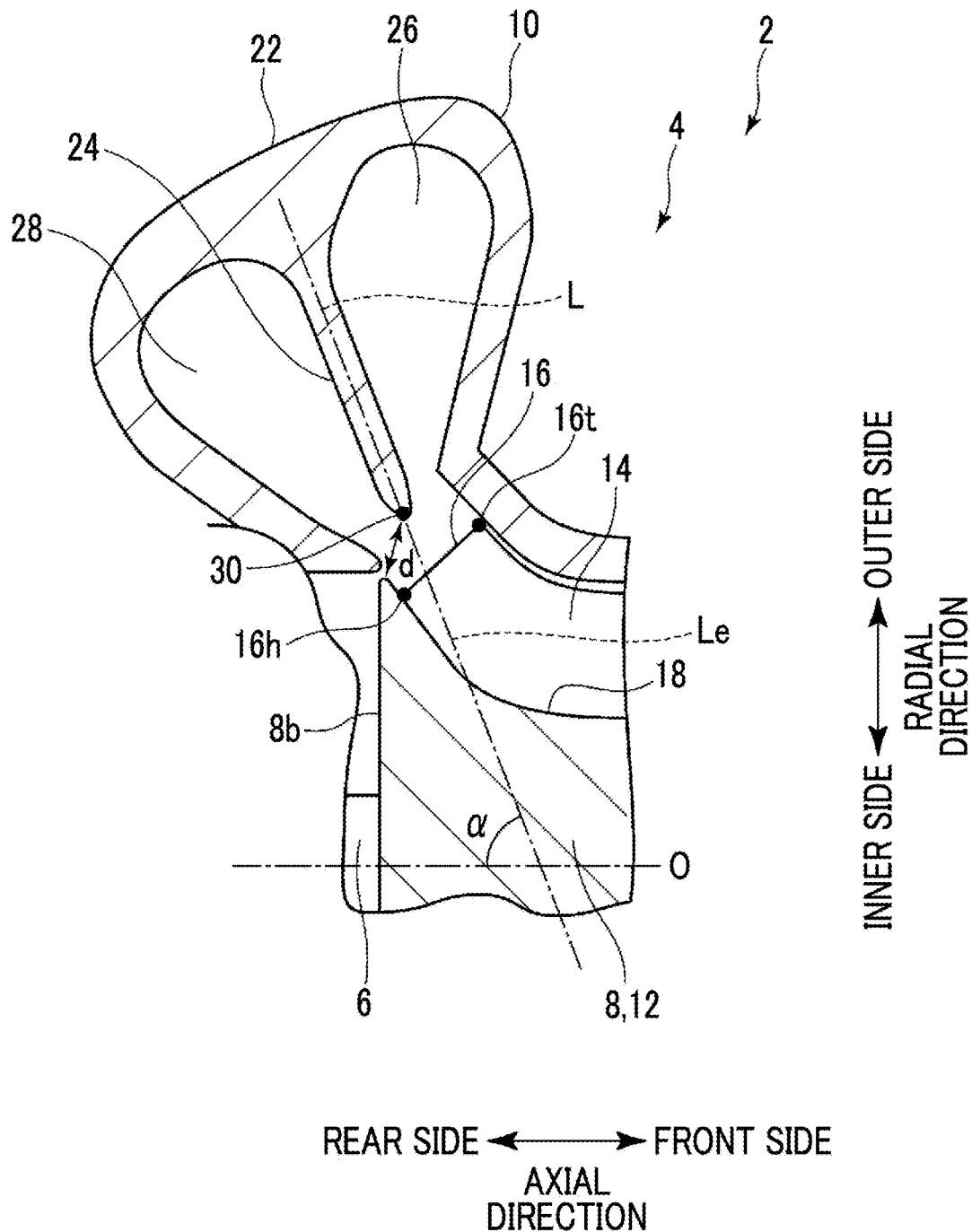
FIG. 3 is an enlarged schematic sectional view showing a part of the mixed flow turbine shown in FIG. 1.

FIG. 3 is an enlarged schematic sectional view showing a part of the mixed flow turbine 4 shown in FIG. 1.

In some embodiments, for example, as shown in FIG. 3, in a cross section including the rotational axis O of the turbine wheel 8 in the mixed flow turbine 4, an angle α formed by an extension line Le of a tip end 30 of the dividing wall 24 and the rotational axis O on a back surface 8b side of the turbine wheel 8 is smaller than 90 degrees. Here, in the cross section including the rotational axis O of the turbine wheel 8, when a trajectory of a center in a thickness direction of the dividing wall 24 from a hub end side to the tip end 30 of the dividing wall 24 is defined as a center line L of the dividing wall 24, the extension line Le of the tip end 30 of the dividing wall 24 means a straight line that the center line L is extended along an inclination direction of the center line L at the position of the tip end 30 from a position of the tip end 30 of the dividing wall 24. In addition, a back surface 8b of the turbine wheel 8 is a surface facing a rear side in the hub 12, and is a surface defining a maximum value of an outer diameter of the hub 12.

Hereinafter, an effect of the mixed flow turbine 4 will be described.

Figure 4A:
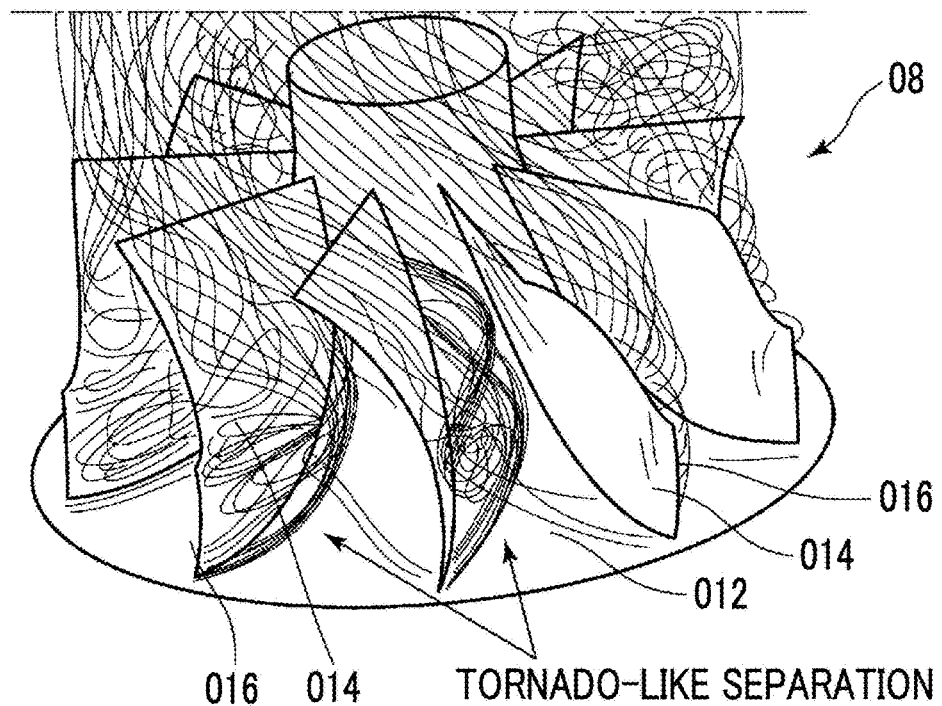
FIG. 4A is an example of a flow analysis result showing a streamline distribution around a turbine wheel in a radial turbine according to a comparative embodiment.
Figure 4B:
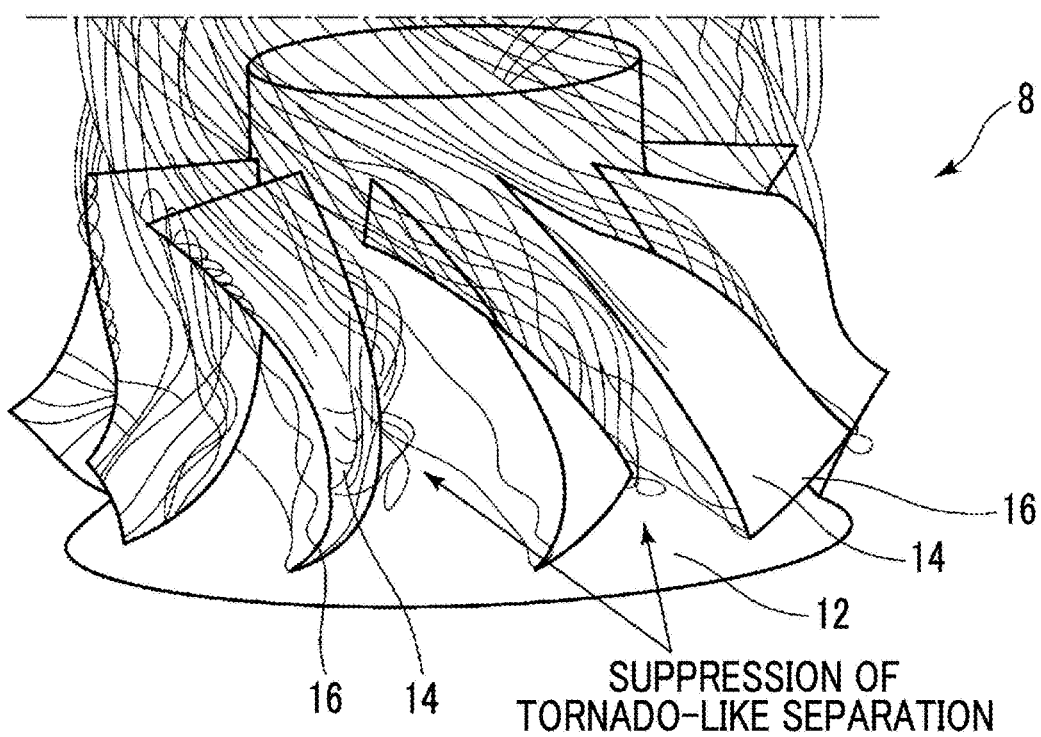
FIG. 4B is an example of a flow analysis result showing a streamline distribution around the turbine wheel in the mixed flow turbine.

FIG. 4A is an example of a flow analysis result showing a streamline distribution in a vicinity of a turbine wheel in a radial turbine 08 according to a comparative embodiment. FIG. 4B is an example of a flow analysis result showing a streamline distribution in the vicinity of the turbine wheel 8 in the mixed flow turbine 4. In the radial turbine shown in FIG. 4A, the ratio Dh/Eave is smaller than 0.4 and leading edges 016 of blades 014 of the turbine wheel 08 are formed to be parallel to the axial direction.

As shown in FIG. 4A, in the radial turbine according to the comparative embodiment, it can be seen that tornadolike separation has occurred on a hub 012 side of the turbine wheel 08. In general, a centrifugal force and a Coriolis force act on a fluid flowing along a turbine wheel. A resultant force of the centrifugal force and the Coriolis force has a component in a direction opposite to a direction of a normal flow along the turbine wheel 08, and it is considered that this acts as an adverse pressure gradient (a pressure gradient acting in the direction opposite to the direction of the normal flow along the turbine wheel) on the fluid, so that the tornado-like separation occurs on the hub 012 side.

In contrast, as shown in FIG. 4B, in the mixed flow turbine 4 according to the embodiment, it can be seen that the tornado-like separation on a hub 12 side of the turbine wheel 8 is suppressed as compared with the turbine according to the comparative embodiment shown in FIG. 4A. As described above, a resultant force of the centrifugal force and the Coriolis force acting on the fluid flowing along the turbine wheel 8 has a component in the direction opposite to a flow direction. However, a magnitude of this component can be reduced by increasing a distance Dh (inner diameter of the hub 12) between the downstream end 18d of the outer peripheral surface 18 of the hub 12 and the rotational axis O of the hub 12. Therefore, by satisfying the relationship Dh/Eave>0.4 as described above, it is considered that the component in the opposite direction can be reduced and the action of the adverse pressure gradient can be suppressed, and the occurrence of the above-described tornado-like separation can be suppressed. For this reason, the mixed flow turbine 4 can realize high turbine efficiency.

In addition, under exhaust pulsation of the engine, the exhaust gas flows into leading edges of blades of a turbine wheel from a direction inclined with respect to the axial direction. In this regard, in the radial turbine according to the comparative embodiment, the leading edges 016 of the blades 014 of the turbine wheel 08 are formed to be parallel to the axial direction (that is, tip ends and hub ends of the leading edges 016 are positioned at the same position in a rotation direction of the turbine wheel). Therefore, an inflow direction of the flow to the blades 014 and an angle of the leading edges 016 of the blades 014 do not match each other, and thus an incidence angle becomes large, and the separation is likely to occur. In contrast, in the above-described mixed flow turbine 4, the tip ends 16t of the leading edges 16 of the blades 14 are positioned on the downstream side in the rotation direction of the turbine wheel 8 with respect to the hub ends 16h of the leading edges 16. Therefore, the flow is along the blades 14, so that the separation is unlikely to occur, and high turbine efficiency can be realized.

In addition, as described with reference to FIG. 3, in the cross section including the rotational axis O of the turbine wheel 8 in the mixed flow turbine 4, the angle α formed by the extension line Le of the tip end 30 of the dividing wall 24 and the rotational axis O on the back surface 8b side of the turbine wheel 8 is smaller than 90 degrees. For this reason, compared to a case where the angle α is 90 degrees or more, a turn of the flow in the middle of a path from each of the front side scroll flow path 26 and the rear side scroll flow path 28 to the turbine wheel 8 can be suppressed, and the flow can be smoothly guided from each of the front side scroll flow path 26 and the rear side scroll flow path 28 to the turbine wheel 8. Accordingly, the occurrence of separation in the turbine wheel 8 can be suppressed.

Figure 5:
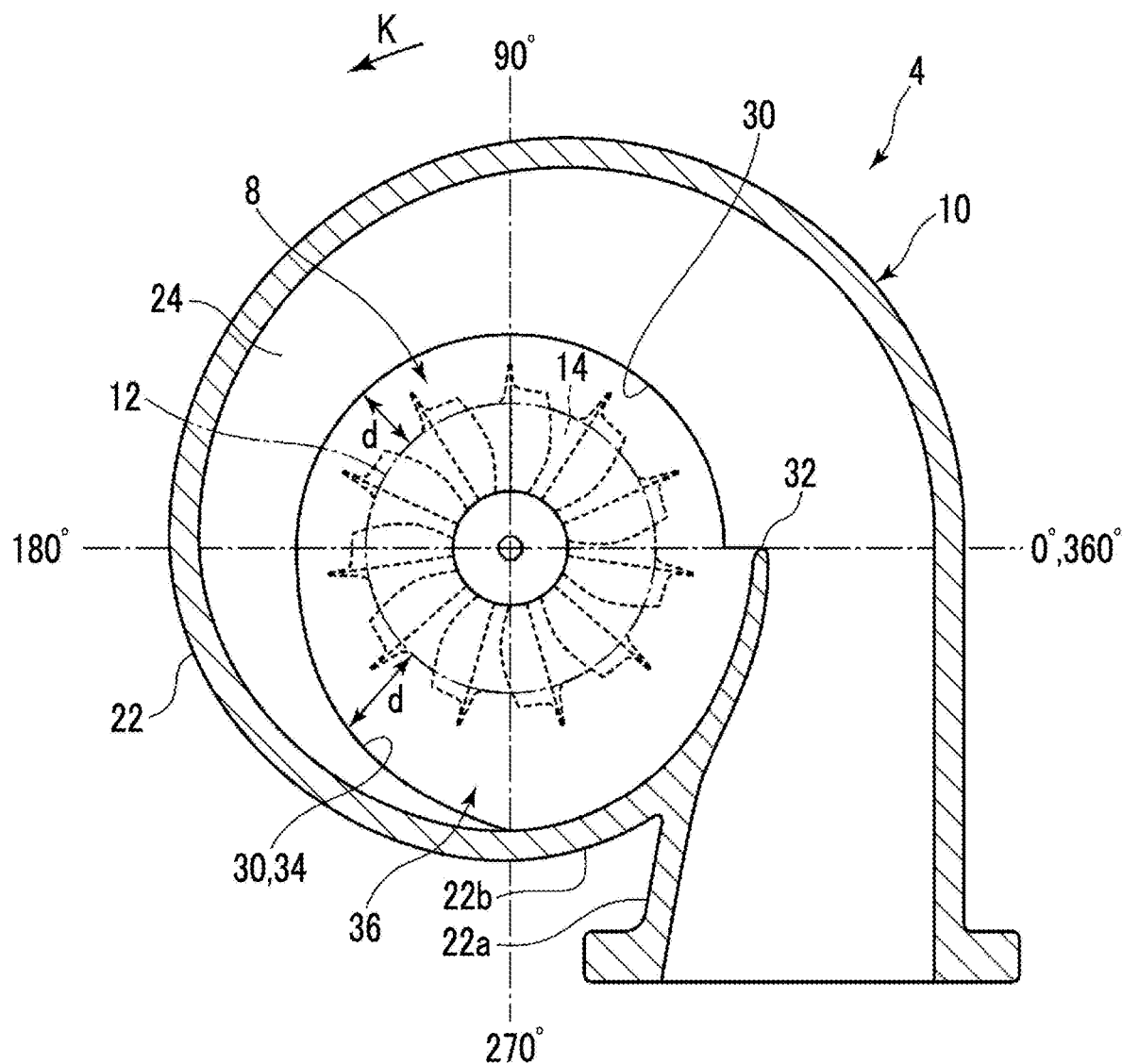
FIG. 5 is a diagram showing an example of a configuration of a dividing wall, and schematically shows a cross section orthogonal to an axial direction of the mixed flow turbine.
Figure 6:
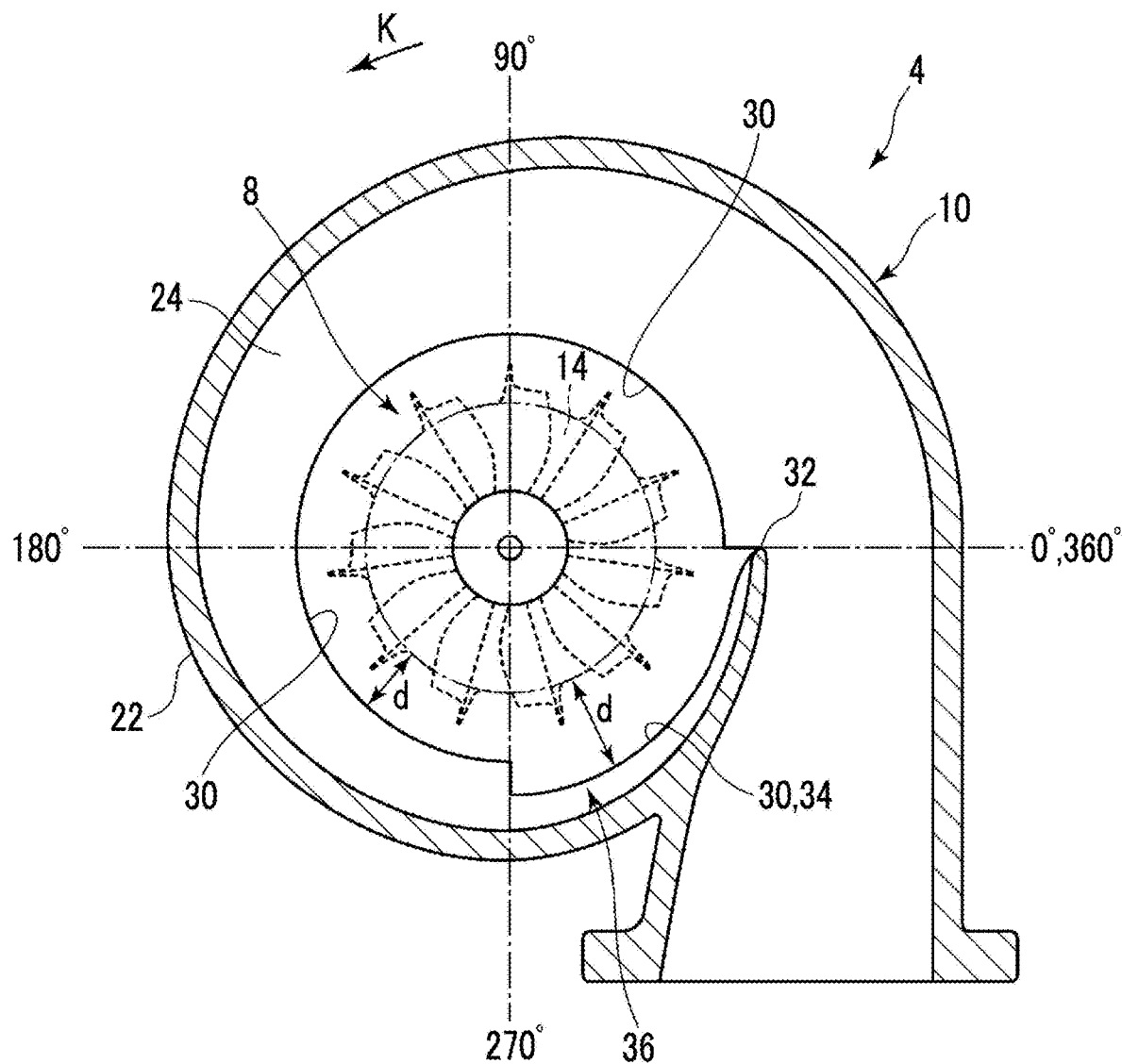
FIG. 6 is a diagram showing another example of a configuration of the dividing wall, and schematically shows a cross section orthogonal to the axial direction of the mixed flow turbine.

FIG. 5 is a diagram showing an example of a configuration of the dividing wall 24, and schematically shows a cross section orthogonal to an axial direction of the mixed flow turbine 4. FIG. 6 is a diagram showing another example of a configuration of the dividing wall 24, and schematically shows a cross section orthogonal to the axial direction of the mixed flow turbine 4.

Here, for example, as shown in FIG. 3, a distance between the tip end 30 of the dividing wall 24 and the hub 12 of the turbine wheel 8 (the shortest distance between the tip end 30 of the dividing wall 24 and the outer peripheral surface 18 of the hub 12) for each position in the circumferential direction is defined as a distance d. In addition, for example, as shown in FIG. 5, a position of a tongue portion 32 of the scroll outer peripheral wall 22 is defined as a position of 0° in the circumferential direction, and a rotation direction K of the turbine wheel 8 is defined as a positive direction of a position in the circumferential direction. As is well known to those skilled in the art, the position of the tongue portion 32 means a position of a tip end of a tongue-shaped protrusion shape formed at a position where a winding start 22a and a winding end 22b in the scroll outer peripheral wall 22 are connected to each other.

In some embodiments, for example, as shown in FIGS. 5 and 6, the distance d in at least a part of a range from 180° to 360° in the circumferential direction is larger than the distance d in at least a part of a range from 0° to 180° in the circumferential direction.

In the example shown in FIG. 5, the distance d is constant in the range from 0° to 180° in the circumferential direction regardless of the position in the circumferential direction. In addition, the dividing wall 24 includes a cutout portion 34, in which a tip end 30 side of the dividing wall 24 is cut out, in a range from 180° to a downstream side in the circumferential direction, and the distance d increases toward the positive direction in the circumferential direction in a range from 180° to 270° in the circumferential direction. For this reason, the distance d at each position in the range from 180° to 270° in the circumferential direction is larger than the distance d at each position in the range from 0° to 180° (excluding) 180° in the circumferential direction. In addition, in the range from 270° to 360° in the circumferential direction, a height of the dividing wall 24 is 0, in other words, the dividing wall 24 is not provided in the range from 270° to 360° in the circumferential direction. The cutout portion 34 does not mean that the cutout portion 34 is cut out by processing, and may be formed by casting or the like such that the distance d is partially increased.

In the example shown in FIG. 6, the distance d is constant in the range from 0° to 270° in the circumferential direction regardless of the position in the circumferential direction. In addition, the dividing wall 24 includes the cutout portion 34, in which the tip end 30 side of the dividing wall 24 is cut out, in a range from 270° to the downstream side in the circumferential direction. In the example shown in the drawing, the cutout portion 34 is formed over a range from 270° to 360° in the circumferential direction. For this reason, the distance d at each position in the range from 270° to 360° in the circumferential direction is larger than the distance d at each position in the range from 0° to 180° in the circumferential direction.

Hereinafter, the effects exhibited by the configuration shown in FIGS. 5 and 6 will be described.

In each of the front side scroll flow path 26 and the rear side scroll flow path 28, in the range from 180° to 360° in the circumferential direction, the flow to the turbine wheel 8 is less likely to smoothly flow than in the range from 0° to 180°, which is a range on a relatively upstream side in the circumferential direction. For this reason, in each of the configurations shown in FIGS. 5 and 6, the distance d in at least a part of a range from 180° to 360° in the circumferential direction is larger than the distance d in at least a part of a range from 0° to 180° in the circumferential direction. Accordingly, in the range from 180° to 360° where the flow to the turbine wheel 8 is unlikely to smoothly flow, a friction loss on a surface of the dividing wall 24 is reduced, so that the flow to the turbine wheel 8 can be promoted, and a variation in an inflow angle of the flow to the blades 14 of the turbine wheel 8 in the circumferential direction can be reduced. As a result, the variation in a torque applied to each of the blades 14 of the turbine wheel 8 can be reduced, and a turbine output can be improved.

Here, each A/R of the front side scroll flow path 26 and the rear side scroll flow path 28 of the mixed flow turbine 4 will be described with reference to the configuration shown in FIG. 6 as an example.

Figure 7:
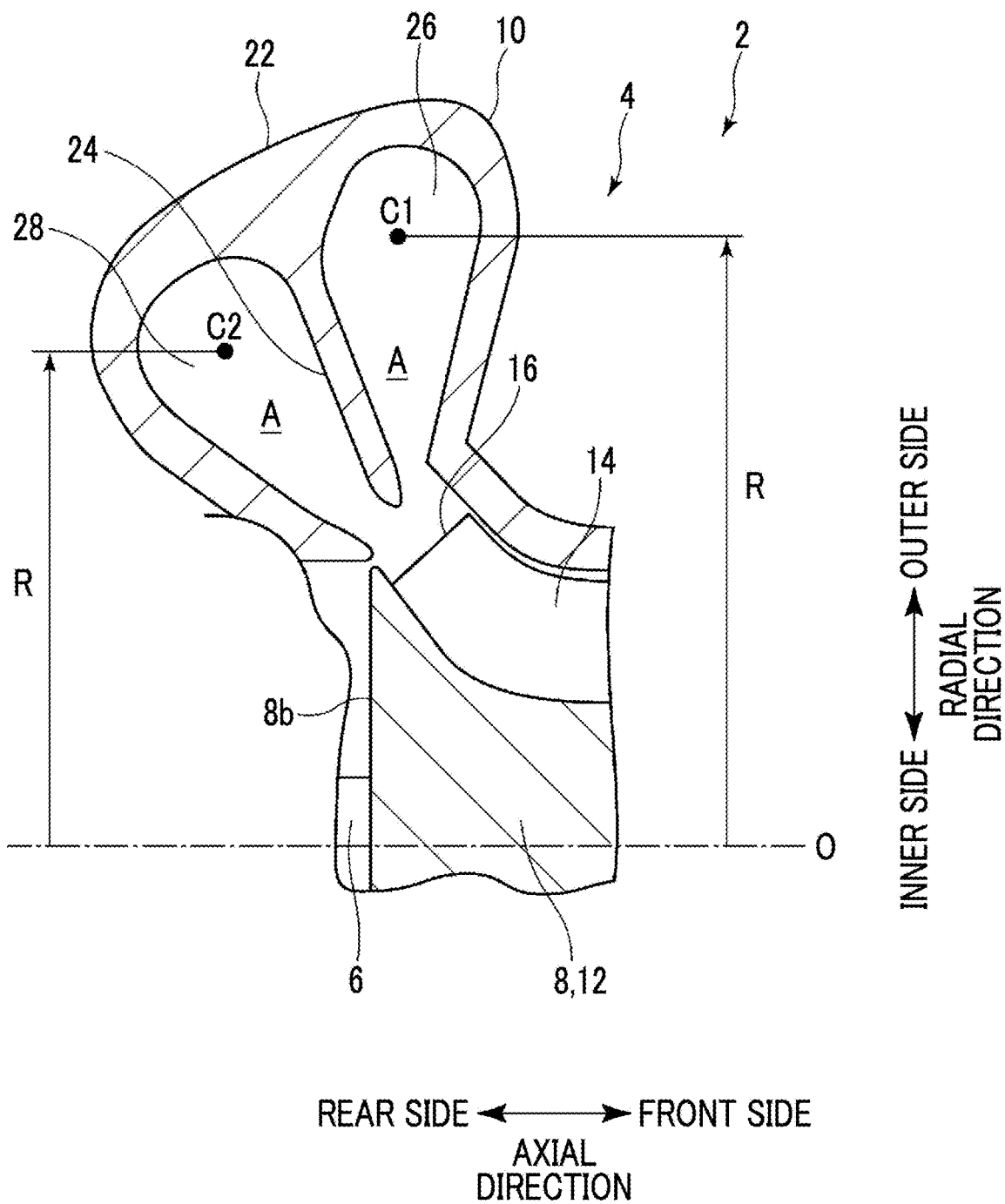
FIG. 7 is an enlarged schematic sectional view showing a part of the mixed flow turbine shown in FIG. 1.

First, as shown in FIG. 7, in the cross section (a cross section orthogonal to the circumferential direction) including the rotational axis O of the mixed flow turbine 4, an area of a region defined by the dividing wall 24 and the scroll outer peripheral wall 22 on a front side of the dividing wall 24 is defined as a flow path area A of the front side scroll flow path 26. In addition, an area of a region defined by the dividing wall 24 and the scroll outer peripheral wall 22 on a rear side of the dividing wall 24 is defined as a flow path area A of the rear side scroll flow path 28. In addition, in the cross section including the rotational axis O of the mixed flow turbine 4, a distance between a center C1 of a flow path cross section of the front side scroll flow path 26 (a centroid of the flow path cross section of the front side scroll flow path 26) and the rotational axis O is defined as a distance R of the front side scroll flow path 26. In addition, a distance between a center C2 of a flow path cross section of the rear side scroll flow path 28 (a centroid of the flow path cross section of the rear side scroll flow path 28) and the rotational axis O is defined as a distance R of the rear side scroll flow path 28.

Figure 8:
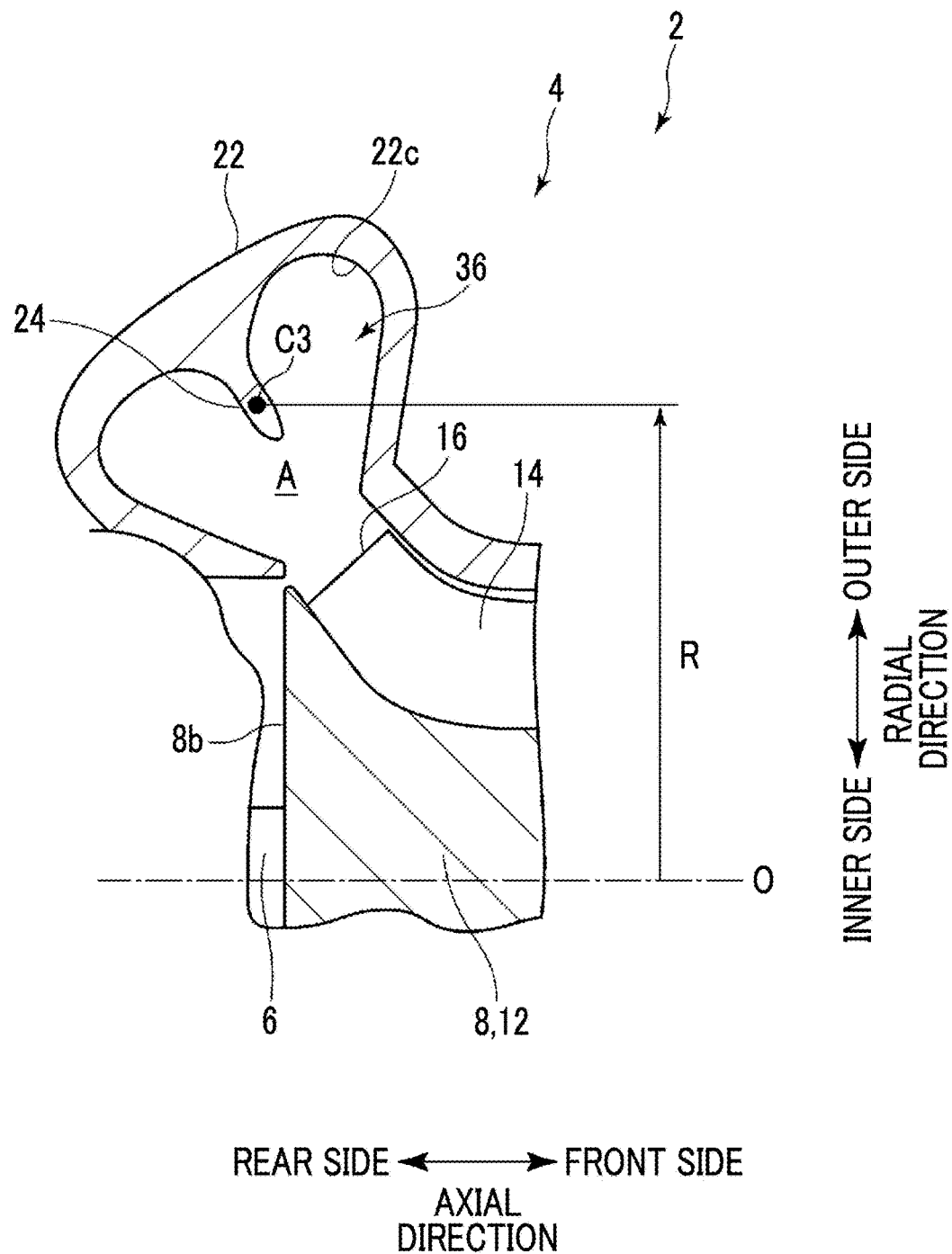
FIG. 8 is an enlarged schematic sectional view showing a part of the mixed flow turbine shown in FIG. 1.

In addition, for a range on a downstream side at a position of 270° in the circumferential direction in the configuration shown in FIG. 6, as shown in FIG. 8, an entire flow path defined by an inner surface 22c of the scroll outer peripheral wall 22 is defined as a front and rear merging portion 36. In addition, in the cross section including the rotational axis O of mixed flow turbine 4, a distance between a center C3 of a flow path cross section of the front and rear merging portion 36 and the rotational axis O is defined as a distance R of the front and rear merging portion 36. In addition, in the cross section including the rotational axis O of the mixed flow turbine 4, an area of a region defined by the inner surface 22c of the scroll outer peripheral wall 22 is defined as a flow path area A of the front and rear merging portion 36.

Figure 9:
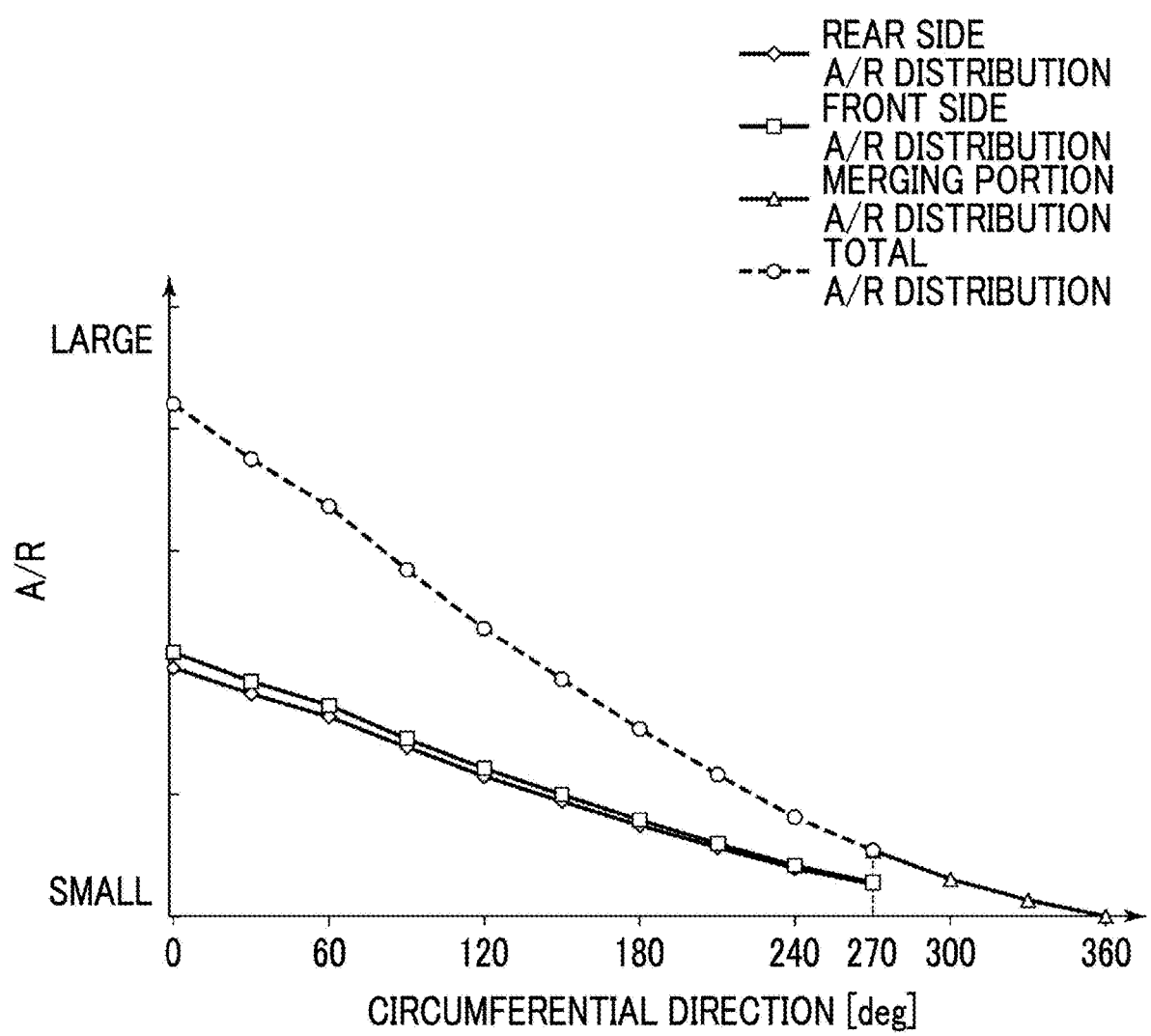
FIG. 9 is a diagram showing a relationship between each A/R of a front side scroll flow path, a rear side scroll flow path, and a front and rear merging portion and a position in the circumferential direction in the configuration shown in FIG. 6.

FIG. 9 is a diagram showing a relationship between each A/R of the front side scroll flow path 26, the rear side scroll flow path 28, and the front and rear merging portion 36 and the position in the circumferential direction in the configuration shown in FIG. 6. In FIG. 9, a distribution of A/R of the front side scroll flow path 26 with respect to the position in the circumferential direction is defined as a front side A/R distribution, a distribution of A/R of the rear side scroll flow path 28 with respect to the position in the circumferential direction is defined as a rear side A/R distribution, and a distribution of A/R of the front and rear merging portion 36 with respect to the position in the circumferential direction is defined as a merging portion A/R distribution, and each distribution is plotted. In addition, a value obtained by summing up the A/R of the front side scroll flow path 26 and the A/R of the rear side scroll flow path 28 for each position in the circumferential direction is defined as total A/R, and a distribution of the total A/R with respect to the position in the circumferential direction is defined as a total A/R distribution and is plotted.

As shown in FIG. 9, it is desirable that an inclination of the total A/R distribution at the position of 270°, which is a position of one end of the cutout portion 34 (refer to FIG. 6) of the dividing wall 24 in the circumferential direction (the position of a start end of a section where the cutout portion 34 is formed in the circumferential direction), is 95% or more and 105% or less of an inclination of the merging portion A/R distribution at the position of 270°. Further, more preferably, it is desirable that the inclination of the total A/R distribution at the position of 270°, which is the position of the one end of the cutout portion 34 of the dividing wall 24 in the circumferential direction, coincides with the inclination of the merging portion A/R distribution at the position of 270°.

Accordingly, it is possible to suppress a change in flow speed or a pressure of the fluid caused by a provision of the cutout portion 34, and it is possible to reduce the variation in the inflow angle of the flow to the blades 14 of the turbine wheel 8 in the circumferential direction. As a result, the variation in a torque applied to each of the blades 14 of the turbine wheel 8 can be reduced, and a turbine output can be improved.

The present disclosure is not limited to the above-described embodiments, and includes a modification of the above-described embodiments and an appropriate combination of the embodiments.

For example, the present disclosure is not limited to the twin scroll type turbine described above, and may be, for example, a so-called single scroll type turbine having only one scroll flow path, or a so-called double scroll type turbine in which a scroll flow path is formed by dividing the scroll flow path in a circumferential direction. In this case as well, the turbine is configured to satisfy the relationship Dh/Eave>0.4, so that high turbine efficiency can be realized.

In some embodiments, the cutout portion 34 need not be provided in the mixed flow turbine 4 shown in FIG. 1, and the distance d between the tip end 30 of the dividing wall 24 and the hub 12 of the turbine wheel 8 may be constant over a range from 0° to 360° in the circumferential direction regardless of the position in the circumferential direction.

In addition, for example, in the mixed flow turbine 4 shown in FIGS. 1 to 3, a value obtained by dividing the distance R of the front side scroll flow path at a position of 180° in the circumferential direction by a distance between the tongue portion 32 of the scroll outer peripheral wall 22 and the rotational axis O may be 1.28 or less, and a value ($R^2$/A) obtained by dividing the distance R of the front side scroll flow path by the A/R of the front side scroll flow path for the position of 180° in the circumferential direction may be 5.7 or less. Accordingly, the variation in the inflow angle of the flow to the blades 14 of the turbine wheel 8 in the circumferential direction can be reduced. According to the study by the inventor of the present application, a parameter Φ indicating unevenness of an inflow angle α of the flow with respect to the blades 14 of the turbine wheel 8, which is defined by the following Equation (a), is, for example, Φ=0.57 in the front side scroll flow path 26, while the parameter Φ was Φ=0.70 in the related art. From the value of the parameter Φ, the effect of reducing the variation in the inflow angle of the flow to the blades 14 of the turbine wheel 8 in the circumferential direction is also shown. As a result, the variation in a torque applied to each of the blades 14 of the turbine wheel 8 can be reduced, and a turbine output can be improved.

$$\Phi = \sqrt{\int (\alpha - \alpha_{average})^2 d\theta} / (\sqrt{2\pi} \, \alpha_{average}) \qquad (a)$$

In Equation (a), $\alpha$ is the inflow angle of the flow with respect to the blades 14, $\alpha_{average}$ is an average value of a in the range from 0° to 360° in the circumferential direction, and $\theta$ is the position in the circumferential direction.

For example, the contents described in each embodiment are understood as follows.

(1) A mixed flow turbine (for example, the mixed flow turbine 4 described above) according to at least one embodiment of the present disclosure includes a turbine wheel (for example, the turbine wheel 8 described above) including a hub (for example, the hub 12 described above), and blades (for example, the blades 14 described above) provided on an outer peripheral surface of the hub at intervals in a circumferential direction of the hub, in which tip ends (for example, the tip ends 16t described above) of leading edges (for example, the leading edges 16 described above) of the blades are positioned on an outer side in a radial direction of the turbine wheel with respect to hub ends (for example, the hub ends 16h described above) of the leading edges, and when a distance between a downstream end (for example, the downstream end 18d described above) of the outer peripheral surface of the hub and a rotational axis (for example, the rotational axis O described above) of the turbine wheel is defined as Dh and an average value of distances (for example, the distance E described above) between each position from the hub ends to the tip ends at the leading edges and the rotational axis is defined as Eave, a relationship Dh/Eave>0.4 is satisfied.

In general, a centrifugal force and a Coriolis force act on a fluid flowing along a turbine wheel. A resultant force of the centrifugal force and the Coriolis force has a component in a direction opposite to a flow direction, and this may act as an adverse pressure gradient (a gradient that causes a flow in the direction opposite to the normal flow) on the fluid, so that the tornado-like separation may occur on the hub side.

In contrast, the mixed flow turbine described in the above (1) is configured to satisfy the relationship Dh/Eave>0.4. As described above, a resultant force of the centrifugal force and the Coriolis force acting on the fluid flowing along the turbine wheel has a component in the direction opposite to a flow direction. However, a magnitude of this component can be reduced by increasing a distance Dh between the downstream end of the outer peripheral surface of the hub and the rotational axis of the hub. Therefore, by satisfying the relationship Dh/Eave>0.4 as described in the above (1), the component in the opposite direction can be reduced and the action of the adverse pressure gradient can be suppressed, and the occurrence of the above-described tornado-like separation can be suppressed. Accordingly, it is possible to realize high turbine efficiency.

(2) In some embodiments, in the mixed flow turbine described in the above (1), the tip ends of the leading edges of the turbine wheel are positioned on a downstream side in a rotation direction of the turbine wheel with respect to the hub ends of the leading edges.

Under exhaust pulsation of the engine, the exhaust gas flows into a leading edge of a blade of a turbine wheel from a direction inclined with respect to the axial direction. In this regard, in the radial turbine in the related art, the leading edge of the blade of the turbine wheel is formed to be parallel to the axial direction, an inflow direction of the flow to the blade and an angle of the leading edge of the blade do not match each other, and thus an incidence angle becomes large, and the separation is likely to occur. In contrast, in the mixed flow turbine described in the above (2), the tip end of the leading edge of the blade is positioned on the downstream side in the rotation direction of the turbine wheel with respect to the hub end of the leading edge. Therefore, the flow is along the blade, so that the separation is unlikely to occur, and high turbine efficiency can be realized.

(3) In some embodiments, in the mixed flow turbine described in the above (1) or (2), a casing (for example, the casing 10 described above) that accommodates the turbine wheel is provided, in which the casing includes a tubular shroud wall (for example, the shroud wall 20 described above) that accommodates the turbine wheel, a scroll outer peripheral wall (for example, the scroll outer peripheral wall 22 described above) that is connected to one end side of the shroud wall and that extends along the circumferential direction, and a dividing wall (for example, the dividing wall 24 described above) that is provided on an inner side of the scroll outer peripheral wall and that partitions an inside of the scroll outer peripheral wall into a front side scroll flow path (for example, the front side scroll flow path 26 described above) and a rear side scroll flow path (for example, the rear side scroll flow path 28 described above) that are arranged in an axial direction of the turbine wheel.

According to the mixed flow turbine described in the above (3), a boost pressure in a low rotation speed range of the engine can be improved by using the turbocharger.

(4) In some embodiments, in the mixed flow turbine described in the above (3), in a cross section including the rotational axis, an angle formed by an extension line (for example, the extension line Le described above) of a tip end of the dividing wall and the rotational axis on a back surface (for example, the back surface 8b described above) side of the turbine wheel is smaller than 90 degrees.

According to the mixed flow turbine described in the above (4), compared to a case where the angle formed by the extension line of the tip end of the dividing wall and the rotational axis on the back surface side of the turbine wheel is 90 degrees or more, a turn of the flow in the middle of a path from each of the front side scroll flow path and the rear side scroll flow path to the turbine wheel can be suppressed, and the flow can be smoothly guided from each of the front side scroll flow path and the rear side scroll flow path to the turbine wheel. Accordingly, the occurrence of separation in the turbine wheel can be suppressed.

(5) In some embodiments, in the mixed flow turbine described in the above (3) or (4), when a position (for example, the position of the tongue portion 32 described above) of a tongue portion of the scroll outer peripheral wall is defined as a position of 0° in the circumferential direction, a rotation direction of the turbine wheel is defined as a positive direction of a position in the circumferential direction, and a distance between a tip end of the dividing wall and the hub for each position in the circumferential direction is defined as d, the distance d in at least a part of a range from 180° to 360° in the circumferential direction is greater than the distance d in at least a part of a range from 0° to 180° in the circumferential direction.

In each of the front side scroll flow path and the rear side scroll flow path, in the range from 180° to 360°, which is a range on a relatively downstream side in the circumferential direction, the flow to the turbine wheel is less likely to smoothly flow than in the range from 0° to 180°, which is a range on a relatively upstream side in the circumferential direction. For this reason, according to the mixed flow turbine described in the above (5), the distance d in at least a part of a range from 180° to 360° in the circumferential direction is larger than the distance d in at least a part of a range from 0° to 180° in the circumferential direction. Accordingly, in the range from 180° to 360° where the flow to the turbine wheel is unlikely to smoothly flow, a throat area of a scroll formed at the tip end of the dividing wall is expanded, so that the flow to the turbine wheel can be promoted, and a variation in an inflow angle of the flow to the turbine wheel in the circumferential direction can be reduced. As a result, the variation in a torque applied to each of the blades of the turbine wheel can be reduced, and a turbine output can be improved.

(6) In some embodiments, in the mixed flow turbine described in the above (5),
the distance d is constant in the range from 0° to 180° in the circumferential direction.

According to the mixed flow turbine described in the above (6), the variation in a torque applied to each of the blades of the turbine wheel can be reduced, and a turbine output can be improved.

(7) In some embodiments, in the mixed flow turbine described in the above (5) or (6),
in the dividing wall, the distance d at each position in a range on a downstream side from a first position (for example, the position of 180° in FIG. 5 or the position of 270° in FIG. 6), which is a position of 180° or more in the circumferential direction, is greater than the distance d at each position in a range from 0° to 180° in the circumferential direction.

According to the mixed flow turbine described in the above (7), the variation in a torque applied to each of the blades of the turbine wheel can be reduced, and a turbine output can be improved.

(8) In some embodiments, in the mixed flow turbine described in the above (7),
when a value obtained by summing up A/R of the front side scroll flow path and A/R of the rear side scroll flow path for each position in the circumferential direction is defined as total A/R, a distribution of the total A/R with respect to the position in the circumferential direction is defined as a total A/R distribution, an entire flow path defined by an inner surface of the scroll outer peripheral wall is defined as a front and rear merging portion (for example, the front and rear merging portion 36 described above), and a distribution of A/R of the front and rear merging portion with respect to the position in the circumferential direction is defined as a merging portion A/R distribution,
an inclination of the total A/R distribution at the first position is 95% or more and 105% or less of an inclination of the merging portion A/R distribution at the first position.

According to the mixed flow turbine described in the above (8), the distance d of the range on the downstream side from the first position, which is the position of 180° or more in the circumferential direction, is increased. In this manner, the friction loss on the surface of the dividing wall in the range can be reduced, and the change in the flow speed or the pressure of the fluid can be suppressed. In addition, the variation in the inflow angle of the flow to the turbine wheel in the circumferential direction can be reduced. As a result, the variation in a torque applied to each of the blades of the turbine wheel can be reduced, and a turbine output can be improved.

(9) In some embodiments, in the mixed flow turbine described in any one of the above (3) to (7),
a value obtained by dividing a distance (for example, the distance R of the front side scroll flow path 26 described above) between a center of a flow path cross section of the front side scroll flow path and the rotational axis at a position of 180° in the circumferential direction by a distance (for example, the distance R of the front side scroll flow path 26 described above) between a tongue portion of the scroll outer peripheral wall and the rotational axis is 1.28 or less, and
a value obtained by dividing the distance (for example, the distance R of the front side scroll flow path 26 described above) between the center of the flow path cross section of the front side scroll flow path and the rotational axis by A/R (for example, the A/R of the front side scroll flow path 26 described above) of the front side scroll flow path for the position of 180° in the circumferential direction is 5.7 or less.

According to the mixed flow turbine described in the above (9), the variation in the inflow angle of the flow to the turbine wheel in the circumferential direction can be reduced. As a result, the variation in a torque applied to each of the blades of the turbine wheel can be reduced, and a turbine output can be improved.

(10) A turbocharger (for example, the turbocharger 2 described above) according to at least one embodiment of the present disclosure includes the mixed flow turbine described in any one of the above (1) to (9).

According to the turbocharger described in the above (10), since it includes the mixed flow turbine described in any one of the above (1) to (9), it is possible to realize high turbine efficiency.

REFERENCE SIGNS LIST

2: turbocharger
4: mixed flow turbine
6: rotating shaft
14: blade
8: turbine wheel
8b: back surface
10: casing
12: hub
16: leading edge
16h: hub end
16t: tip end
18: outer peripheral surface
18d: downstream end
20: shroud wall
21: flow path
22: scroll outer peripheral wall
22a: winding start
22b: winding end
22c: inner surface
24: dividing wall
26: front side scroll flow path
28: rear side scroll flow path
30: tip end
32: tongue portion 34: cutout portion
36: front and rear merging portion

The invention claimed is:

1. A mixed flow turbine comprising:
a turbine wheel including
  a hub, and
  blades provided on an outer peripheral surface of the hub at intervals in a circumferential direction of the hub,
wherein tip ends of leading edges of the blades are positioned on an outer side in a radial direction of the turbine wheel with respect to hub ends of the leading edges, and
when a distance between a downstream end of the outer peripheral surface of the hub and a rotational axis of the turbine wheel is defined as Dh and an average value of distances between each position from the hub ends to the tip ends at the leading edges and the rotational axis is defined as Eave, a relationship Dh/Eave>0.4 is satisfied,
wherein the mixed flow turbine further comprises:
a casing that accommodates the turbine wheel,
wherein the casing includes
  a tubular shroud wall that accommodates the turbine wheel,
  a scroll outer peripheral wall that is connected to one end side of the shroud wall and that extends along the circumferential direction, and
  a dividing wall that is provided on an inner side of the scroll outer peripheral wall and that partitions an inside of the scroll outer peripheral wall into a front side scroll flow path and a rear side scroll flow path that are arranged in an axial direction of the turbine wheel,
wherein in a cross section including the rotational axis, an angle formed by an extension line of a tip end of the dividing wall and the rotational axis on a back surface side of the turbine wheel is smaller than 90 degrees, and
wherein in a cross section including the rotational axis, the extension line intersects the leading edge at a radially inner side with respect to a midpoint point in the radial direction of the leading edge.

2. The mixed flow turbine according to claim 1, wherein the tip ends of the leading edges of the turbine wheel are positioned on a downstream side in a rotation direction of the turbine wheel with respect to the hub ends of the leading edges.

3. The mixed flow turbine according to claim 1, wherein, when a position of a tongue portion of the scroll outer peripheral wall is defined as a position of 0° in the circumferential direction, a rotation direction of the turbine wheel is defined as a positive direction of a position in the circumferential direction, and a distance between a tip end of the dividing wall and the hub for each position in the circumferential direction is defined as d,
  the distance d in at least a part of a range from 180° to 360° in the circumferential direction is greater than the distance d in at least a part of a range from 0° to 180° in the circumferential direction.

4. The mixed flow turbine according to claim 3, wherein the distance d is constant in the range from 0° to 180° in the circumferential direction.

5. The mixed flow turbine according to claim 3, wherein in the dividing wall, the distance d at each position in a range on a downstream side from a first position, which is a position of 180° or more in the circumferential direction, is greater than the distance d at each position in a range from 0° to 180° in the circumferential direction.

6. The mixed flow turbine according to claim 5, wherein, when a value obtained by summing up A/R of the front side scroll flow path and A/R of the rear side scroll flow path for each position in the circumferential direction is defined as total A/R, a distribution of the total A/R with respect to the position in the circumferential direction is defined as a total A/R distribution, an entire flow path defined by an inner surface of the scroll outer peripheral wall is defined as a front and rear merging portion, and a distribution of A/R of the front and rear merging portion with respect to the position in the circumferential direction is defined as a merging portion A/R distribution,
  an inclination of the total A/R distribution at the first position is 95% or more and 105% or less of an inclination of the merging portion A/R distribution at the first position.

7. The mixed flow turbine according to claim 1,
wherein a value obtained by dividing a distance between a center of a flow path cross section of the front side scroll flow path and the rotational axis at a position of 180° in the circumferential direction by a distance between a tongue portion of the scroll outer peripheral wall and the rotational axis is 1.28 or less, and
a value obtained by dividing the distance between the center of the flow path cross section of the front side scroll flow path and the rotational axis by A/R of the front side scroll flow path for the position of 180° in the circumferential direction is 5.7 or less.

8. A turbocharger comprising:
the mixed flow turbine according to claim 1.

9. The mixed flow turbine according to claim 1,
wherein the leading edge extends at a constant inclination angle from the hub ends to the tip ends.

* * * * *